United States Patent
Martins

[11] Patent Number: 6,036,164
[45] Date of Patent: Mar. 14, 2000

[54] SHOCK ABSORBENT BICYCLE SEAT

[76] Inventor: Carlos Martins, 189 Crann St., Hillside, N.J. 07205

[21] Appl. No.: 09/007,413

[22] Filed: Jan. 15, 1998

[51] Int. Cl.[7] ............................ F16M 13/00; F16M 11/26
[52] U.S. Cl. ...................... 248/600; 248/188.5; 248/565
[58] Field of Search .................................. 248/560, 565, 248/569, 581, 631, 599, 562, 188.5, 600; 280/283

[56] References Cited

U.S. PATENT DOCUMENTS

| | | | |
|---|---|---|---|
| 5,370,351 | 12/1994 | Chen | 248/600 |
| 5,713,555 | 2/1998 | Zurfluh et al. | 248/631 |
| 5,772,165 | 6/1998 | Schroder | 248/188.5 |
| 5,826,935 | 10/1998 | DeFreitas | 248/631 |
| 5,829,733 | 11/1998 | Becker | 248/631 |
| 5,833,255 | 11/1998 | Sarder et al. | 280/283 |

*Primary Examiner*—Anita M. King
*Assistant Examiner*—David Heisey

[57] ABSTRACT

A shock absorbent bicycle seat is provided including a stationary post with a lower half removably coupled within a seat sleeve of a bicycle. The stationary post further has a guide rod mounted in parallel therewith. A movable post is slidably coupled to the stationary post in coaxial relationship therewith. The post having a cut out formed therein for slidably receiving the guide rod. The movable post further has a spring for urging the movable post in an extended orientation with respect to the stationary post.

4 Claims, 2 Drawing Sheets

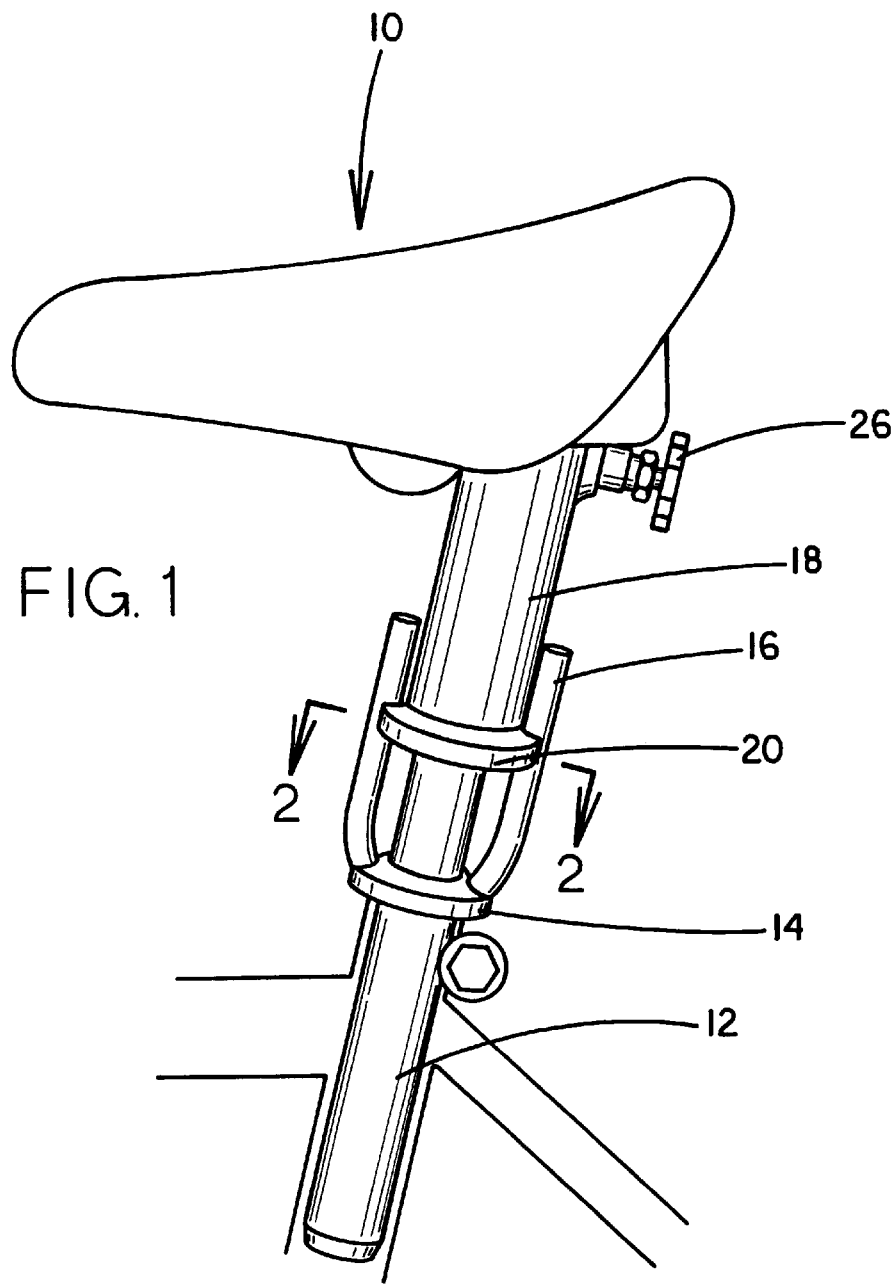
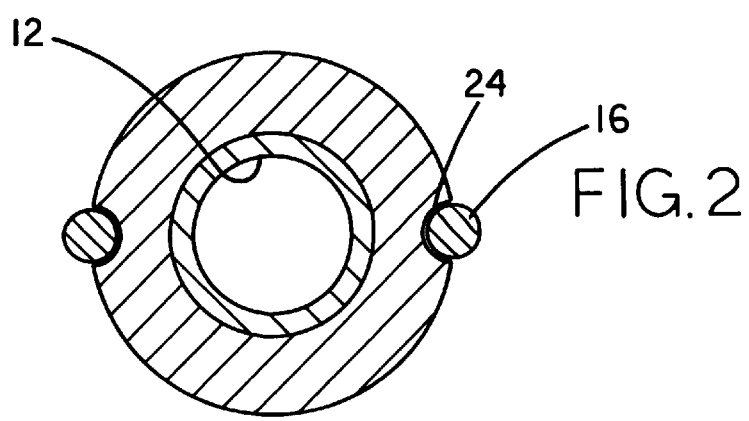

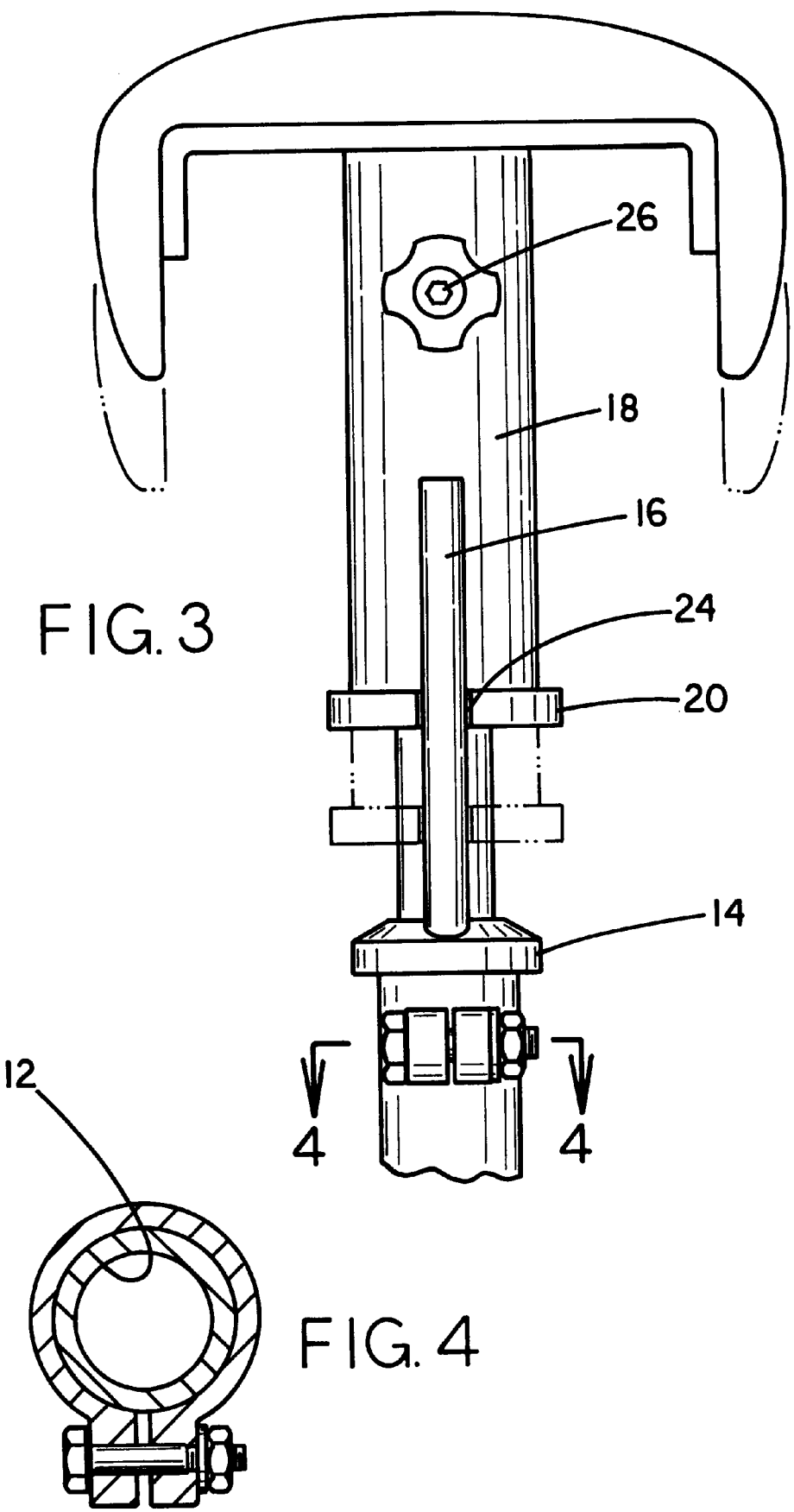

SHOCK ABSORBENT BICYCLE SEAT

BACKGROUND OF THE INVENTION

1. Field of the Invention

The present invention relates to bicycle seats and more particularly pertains to a new shock absorbent bicycle seat for absorbing vibration during use of a bicycle.

2. Description of the Prior Art

The use of bicycle seats is known in the prior art. More specifically, bicycle seats heretofore devised and utilized are known to consist basically of familiar, expected and obvious structural configurations, notwithstanding the myriad of designs encompassed by the crowded prior art which have been developed for the fulfillment of countless objectives and requirements.

Known prior art bicycle seats include U.S. Pat. No. 5,324,058; U.S. Pat. No. 5,324,174; U.S. Pat. No. 5,344,170; U.S. Pat. No. 5,383,705; U.S. Pat. No. 5,236,169; and U.S. Pat. No. Des. 288,420.

In these respects, the shock absorbent bicycle seat according to the present invention substantially departs from the conventional concepts and designs of the prior art, and in so doing provides an apparatus primarily developed for the purpose of absorbing vibration during use of a bicycle.

SUMMARY OF THE INVENTION

In view of the foregoing disadvantages inherent in the known types of bicycle seats now present in the prior art, the present invention provides a new shock absorbent bicycle seat construction wherein the same can be utilized for absorbing vibration during use of a bicycle.

The general purpose of the present invention, which will be described subsequently in greater detail, is to provide a new shock absorbent bicycle seat apparatus and method which has many of the advantages of the bicycle seats mentioned heretofore and many novel features that result in a new shock absorbent bicycle seat which is not anticipated, rendered obvious, suggested, or even implied by any of the prior art bicycle seats, either alone or in any combination thereof.

To attain this, the present invention generally comprises a stationary post having a cylindrical configuration with a first predetermined diameter along an entire length thereof. The stationary post has an annular flange coupled to a center thereof and extended radially therefrom. The annular flange has a lower disk-shaped portion and an upper frusto-conical portion. The upper frusto-conical portion of the flange of the stationary post has a pair of guide rods each fixedly coupled at lower ends thereof to diametrically opposed sides of the annular flange, as shown in FIG. 2. Each guide rod includes a short arcuate extent and elongated linear extent. The linear extents each remain parallel with the stationary post. The rods each have a length equal ½ that of the stationary post. By this structure, a lower half of the stationary post is removably coupled within a seat sleeve of a bicycle with the lower disk-shaped portion abutting the sleeve. Further provided is a movable post having a hollow cylindrical configuration. The movable post is equipped with a second predetermined diameter along an entire length thereof which is greater than the first predetermined diameter. The movable post has an annular flange coupled to lower end thereof and extended radially therefrom. The annular flange of the movable post has a lower disk-shaped portion and an upper frusto-conical portion. A pair of circular cut outs are formed in diametrically opposed points on the annular flange of the movable post. The movable post further includes a top end coupled to a bottom of a padded seat of the bicycle. Formed in a lower end of the movable post is a bore for slidably receiving an upper half of the stationary post. In operation, the circular cut outs slidably receive the linear extents of the rods of the stationary post. The movable post has a pressurized compartment therein. A spring is also situated within the movable post for urging the movable post in an extended orientation with respect to the stationary post. Finally, an air valve is provided having a rotatable dial for allowing the selective release of air from the pressurized compartment of the movable post. As such, the force associated with the urging of the movable post with respect to the stationary post may be adjusted.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shock absorbent bicycle seat apparatus and method which has many of the advantages of the bicycle seats mentioned heretofore and many novel features that result in a new shock absorbent bicycle seat which is not anticipated, rendered obvious, suggested, or even implied by any of the prior art bicycle seats, either alone or in any combination thereof.

It is another object of the present invention to provide a new shock absorbent bicycle seat which may be easily and efficiently manufactured and marketed.

It is a further object of the present invention to provide a new shock absorbent bicycle seat which is of a durable and reliable construction.

An even further object of the present invention is to provide a new shock absorbent bicycle seat which is susceptible of a low cost of manufacture with regard to both materials and labor, and which accordingly is then susceptible of low prices of sale to the consuming public, thereby making such shock absorbent bicycle seat economically available to the buying public.

Still yet another object of the present invention is to provide a new shock absorbent bicycle seat which provides in the apparatuses and methods of the prior art some of the advantages thereof, while simultaneously overcoming some of the disadvantages normally associated therewith.

Still another object of the present invention is to provide a new shock absorbent bicycle seat for absorbing vibration during use of a bicycle.

Even still another object of the present invention is to provide a new shock absorbent bicycle seat that includes a stationary post with a lower half removably coupled within a seat sleeve of a bicycle. The stationary post further has a guide rod mounted in parallel therewith. A movable post is slidably coupled to the stationary post in coaxial relationship therewith. The post having a cut out formed therein for slidably receiving the guide rod. The movable post further has a spring for urging the movable post in an extended orientation with respect to the stationary post.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new shock absorbent bicycle seat according to the present invention.

FIG. 2 is a cross-sectional view of the present invention taken along line 2—2 shown in FIG. 1.

FIG. 3 is a rear view of the present invention.

FIG. 4 is a cross-sectional view of the present invention taken along line 4—4 shown in FIG. 3.

DESCRIPTION OF THE PREFERRED EMBODIMENT

With reference now to the drawings, and in particular to FIGS. 1 through 4 thereof, a new shock absorbent bicycle seat embodying the principles and concepts of the present invention and generally designated by the reference numeral 10 will be described.

The present invention, designated as numeral 10, includes a stationary post 12 having a cylindrical configuration with a first predetermined diameter along an entire length thereof. The stationary post has an annular flange 14 coupled to a center thereof and extended radially therefrom. The annular flange has a lower disk-shaped portion and an upper frusto-conical portion.

The upper frusto-conical portion of the flange of the stationary post has a pair of guide rods 16 each fixedly coupled at lower ends thereof to diametrically opposed sides of the annular flange, as shown in FIG. 2. Each guide rod includes a short arcuate extent and elongated linear extent. The linear extents each remain parallel with the stationary post. The rods each have a length equal ½ that of the stationary post. By this structure, a lower half of the stationary post is removably coupled within a seat sleeve of a bicycle with the lower disk-shaped portion abutting the sleeve. As shown in FIG. 3, when the stationary post is situated within the sleeve, the guide rods reside in a plane in which the bicycle generally resides.

Further provided is a movable post 18 having a hollow cylindrical configuration. The movable post is equipped with a second predetermined diameter along an entire length thereof which is greater than the first predetermined diameter. Further, the movable post has a length which is equal to ½ that of the stationary post. The movable post has an annular flange 20 coupled to lower end thereof and extended radially therefrom. The annular flange of the movable post has a lower disk-shaped portion and an upper frusto-conical portion. A pair of circular cut outs 24 are formed in diametrically opposed points on the annular flange of the movable post. The movable post further includes a top end coupled to a bottom of a padded seat of the bicycle.

The movable post has an open lower end 28 for slidably receiving an upper half of the stationary post. In operation, the circular cut outs slidably receive the linear extents of the rods of the stationary post. The movable post has a hollow interior 30 which defines pressurized compartment therein. A spring (not shown) is also situated within the movable post for urging the movable post in an extended orientation with respect to the stationary post. Preferably, the stationary post has a plunger mounted on a top end thereof for biasing the spring and further creating a seal within the pressurized compartment.

Finally, an air valve 26 is provided having a rotatable dial for allowing the selective release of air from the pressurized compartment of the movable post. As such, the force associated with the urging of the movable post with respect to the stationary post may be adjusted. It should be noted that air may be added via a port mounted on the sleeve. Such port may be coupled with a bicycle pump or the like. In the preferred embodiment, the dial faces rearwardly and is situated just below the seat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A shock absorbing apparatus for a bicycle seat comprising:

a stationary post having a cylindrical configuration with a first predetermined diameter along an entire length thereof, the stationary post having an annular flange coupled to a center thereof and extending radially therefrom, the annular flange having a lower disk-shaped portion and an upper frusto-conical portion, the upper frusto-conical portion having a pair of cylindrical guide rods upwardly extending therefrom, the guide rods being located at diametrically opposite sides of the annular flange, each guide rod having a lower end fixedly coupled against pivoting to the upper frusto-conical portion of the annular flange, a free upper end, a short arcuate extent adjacent the lower end of the respective guide rod, and elongated linear extent adjacent the free upper end of the respective guide rod, the linear extents of the guide rods being extended substantially parallel to one another and substantially parallel to the stationary post, wherein the guide rods each have a length equal ½ that of the stationary post, whereby a lower half of the stationary post is removably coupled within a seat sleeve of a bicycle with the lower disk-shaped portion abutting the sleeve;

the stationary post having a longitudinal axis, the guide rods and the longitudinal axis of the stationary post lying in a common vertical plane with one another;

a tubular movable post having a hollow cylindrical interior with a second predetermined diameter along an entire length thereof which is greater than the first predetermined diameter, the movable post having an annular flange coupled to an open lower end thereof and extending radially therefrom, the annular flange of the movable post having a lower disk-shaped portion and an upper frusto-conical portion and a pair of semi-circular cut outs formed in diametrically opposed points on the annular flange of the movable post, the movable post further including a top end coupled to a bottom of a padded seat of the bicycle and a lower end of the movable post telescopically slidably receiving an upper half of the stationary post wherein the semi-circular cut outs slidably receive the linear extents of the guide rods of the stationary post, the movable post being interposed between the guide rods, the upper ends of the guide rods being spaced apart beneath the seat to permit downwards movement of the movable post to permit additional telescopic receiving of the stationary post into the movable post, the hollow cylindrical interior of the movable post defining a compartment therein for holding air therein; and an air valve having a rotatable dial for allowing the selective release of air from the compartment of the movable post, the rotatable dial of the air valve being rearwardly extended from the movable post and positioned between the seat and the upper ends of the guide rods.

2. A shock absorbing apparatus for a bicycle seat comprising:

a stationary post having a cylindrical configuration, the stationary post having an annular flange coupled to a center thereof and extending radially therefrom, the annular flange having a lower disk-shaped portion and an upper frusto-conical portion, the upper frusto-conical portion having at least one cylindrical guide rod extending upwardly therefrom, said guide rod having a lower end fixedly coupled against pivoting to the upper frusto-conical portion of the annular flange;

a tubular movable post having a hollow cylindrical interior with a diameter along greater than a diameter of said stationary post, the movable post having an annular flange coupled to an open lower end thereof and extending radially therefrom, the annular flange of the movable post having a lower disk-shaped portion and an upper frusto-conical portion and at least one semi-circular cut out formed on the annular flange of the movable post, a lower end of the movable post being telescopically slidably receiving an upper half of the stationary post;

wherein the semi-circular cut out slidably receives the linear extent of the guide rod of the stationary post;

wherein the hollow cylindrical interior of the movable post defining a compartment therein for holding air therein; and an air valve having a rotatable dial for allowing the selective release of air from the compartment of the movable post.

3. The shock absorbing apparatus for a bicycle seat as in claim 2, and further comprising:

a second cylindrical guide rod upwardly extending from said annular flange, wherein the guide rods are located at diametrically opposite sides of the annular flange, each guide rod having a lower end fixedly coupled against pivoting to the upper frusto-conical portion of the annular flange, a free upper end, a short arcuate extent adjacent the lower end of the respective guide rod, and elongated linear extent adjacent the free upper end of the respective guide rod, the linear extents of the guide rods being extended substantially parallel to one another and substantially parallel to the stationary post, whereby a lower half of the stationary post is removably coupled in a seat sleeve of a bicycle with the lower disk-shaped portion abutting the sleeve; and a second semi-circular cut out formed in the annular flange of the movable post, said semi-circular cut outs being on diametrically opposed points on the annular flange of the movable post.

4. The shock absorbing apparatus for a bicycle seat as in claim 2, and further comprising:

a top end of the movable post being coupled to a bottom of a padded seat of the bicycle; and a lower end of the movable post telescopically slidably receiving an upper half of the stationary post wherein the semi-circular cut outs slidably receive the linear extents of the guide rods of the stationary post, the movable post being interposed between the guide rods, the upper ends of the guide rods being spaced apart beneath the seat to permit downwards movement of the movable post to permit additional telescopic receiving of the stationary post into the movable post.

* * * * *